United States Patent
Tsumura et al.

(10) Patent No.: US 8,730,205 B2
(45) Date of Patent: May 20, 2014

(54) TOUCH PANEL INPUT DEVICE AND GESTURE DETECTING METHOD

(75) Inventors: Masahiro Tsumura, Yokohama (JP); Tetsuya Okunishi, Yokohama (JP)

(73) Assignee: Elo Touch Solutions, Inc., Milpitas, CA (US)

( * ) Notice: Subject to any disclaimer, the term of this patent is extended or adjusted under 35 U.S.C. 154(b) by 272 days.

(21) Appl. No.: 13/233,816

(22) Filed: Sep. 15, 2011

(65) Prior Publication Data

US 2012/0092289 A1 Apr. 19, 2012

(30) Foreign Application Priority Data

Oct. 15, 2010 (JP) ................... 2010-232410

(51) Int. Cl.
*G06F 3/045* (2006.01)
(52) U.S. Cl.
USPC ........................................... 345/174
(58) Field of Classification Search
None
See application file for complete search history.

(56) References Cited

U.S. PATENT DOCUMENTS

| | | | |
|---|---|---|---|
| 4,933,660 A | 6/1990 | Wynne, Jr. | |
| 5,402,151 A | 3/1995 | Duwaer | |
| 5,438,168 A | 8/1995 | Wolfe et al. | |
| 5,563,381 A | 10/1996 | Crooks et al. | |
| 5,861,583 A | 1/1999 | Schediwy et al. | |
| 5,973,676 A | 10/1999 | Kawakura | |
| 6,255,604 B1 | 7/2001 | Tokioka et al. | |
| 6,492,979 B1 | 12/2002 | Kent | |
| 6,593,916 B1 | 7/2003 | Aroyan | |
| 6,646,634 B2 * | 11/2003 | Berelovich et al. | ........... 345/174 |
| 6,958,749 B1 | 10/2005 | Matsushita et al. | |
| 7,023,427 B2 | 4/2006 | Kraus et al. | |
| 7,034,806 B2 | 4/2006 | Nakagawa | |
| 7,180,508 B2 | 2/2007 | Kent et al. | |
| 7,254,775 B2 | 8/2007 | Geaghan et al. | |
| 7,265,686 B2 | 9/2007 | Hurst et al. | |
| 7,842,266 B2 | 11/2010 | Takahashi et al. | |

(Continued)

FOREIGN PATENT DOCUMENTS

| | | |
|---|---|---|
| EP | 0194861 A2 | 9/1986 |
| EP | 0309946 A2 | 4/1989 |

(Continued)

OTHER PUBLICATIONS

Horowitz, P., The Art of Electronics, Jan. 1, 1989, Cambridge Univ. Press, pp. 280-285.

(Continued)

*Primary Examiner* — Jason Olson
(74) *Attorney, Agent, or Firm* — Alston & Bird LLP

(57) ABSTRACT

Detection of complex input by two touched points are enabled to be detected by a resistive film type touch panel input device equipped with two resistive films facing each other with a minute gap therebetween; a first electrode pair; a second electrode pair extending in directions perpendicular to the first electrode pair; means for applying voltages between the first electrode pair and between the second electrode pair; means for measuring the voltage which is divided at two touch points with respect to the first electrode pair and the second electrode pair, when the resistive films are caused to contact each other by being touched at two points; means for measuring currents that flow between the first electrode pair and between the second electrode pairs when the touch occurs; and discriminating means, for discriminating the trajectories of the two touch points based on the values of the measured voltages and currents.

19 Claims, 5 Drawing Sheets

(56) References Cited

U.S. PATENT DOCUMENTS

| | | |
|---|---|---|
| 7,907,125 B2 | 3/2011 | Weiss et al. |
| 8,345,019 B2 * | 1/2013 | D'Souza et al. .............. 345/174 |
| 2003/0063073 A1 | 4/2003 | Geaghan et al. |
| 2005/0046621 A1 | 3/2005 | Kaikuranta |
| 2005/0076824 A1 | 4/2005 | Cross et al. |
| 2005/0110772 A1 | 5/2005 | Kong et al. |
| 2006/0025218 A1 | 2/2006 | Hotta |
| 2006/0026536 A1 | 2/2006 | Hotelling et al. |
| 2007/0085553 A1 | 4/2007 | Keroe et al. |
| 2007/0285404 A1 | 12/2007 | Rimon et al. |
| 2009/0189877 A1 | 7/2009 | Washino et al. |
| 2009/0322700 A1 | 12/2009 | D'Souza et al. |
| 2009/0322701 A1 | 12/2009 | D'Souza et al. |
| 2010/0066701 A1 | 3/2010 | Ningrat |
| 2010/0214231 A1 | 8/2010 | D'Souza et al. |

FOREIGN PATENT DOCUMENTS

| | | |
|---|---|---|
| EP | 0745953 A2 | 12/1996 |
| EP | 0773496 A1 | 5/1997 |
| JP | 5-265632 | 10/1993 |
| JP | 9-160709 A | 6/1997 |
| JP | 2000-105645 A | 4/2000 |
| JP | 2007-122522 | 5/2007 |
| JP | 2009-146191 A | 7/2009 |
| WO | WO-92/10823 A1 | 6/1992 |

OTHER PUBLICATIONS

Horowitz, P., The Art of Electronics, Jan. 1, 1989, Cambridge Univ. Press, pp. 88-91.

Jorn Loviscach Ed—Association for Computing Machinery: "TwoFinger Input with a Standard Touch Screen" UIST 2007. Proceedings of the 20th Annual ACM Symposium on User Interface Software and Technology, Oct. 7-10, 2007, Newport, Rhode Island, USA; [ACM Symposium on User Interface Software and Technology], New York, NY; ACM, US Oct. 7, 2007, pp. 169-172.

International Search Report for International Appl. No. PCT/US2010/000278, mailed May 28, 2010.

International Search Report from International Appl. No. PCT/US2009/003831, mailed Aug. 3, 2010.

International Search Report from International Appl. No. PCT/US2009/003836, mailed Jul. 1, 2010.

* cited by examiner

TOUCH PANEL INPUT DEVICE AND GESTURE DETECTING METHOD

CROSS-REFERENCE TO RELATED APPLICATION

This application claims priority from Japanese patent application no. 2010-232410 filed on Oct. 15, 2010, the contents of which are incorporated by reference for all purposes.

TECHNICAL FIELD

The present invention is related to a touch panel input device, and more specifically to a resistive film type touch panel input device.

In addition, the present invention is related to a gesture detecting method that employs the touch panel input device.

BACKGROUND

There are known resistive film type touch panel input devices having two dimensional touch input surfaces, that can detect the positions of points (touch points) on the touch input surfaces contacted by fingers or the like, as disclosed in Japanese Unexamined Patent Publication No. 2000-105645; Japanese Unexamined Patent Publication No. 2007-122522; and US Published Patent Application No. 2009/0322700.

This type of touch panel input device is basically constituted by: two resistive films which are arranged to face each other with a minute gap therebetween; an electrode pair (X electrode pair) formed by electrodes provided at the edges that face each other of one of the resistive films; an electrode pair (Y electrode pair) formed by electrodes provided at the edges of the other one of the resistive films that face each other and extend in directions perpendicular to the X electrode pair; means for applying voltages between the X electrode pair and between the Y electrode pair; and means for measuring the voltage which is divided at a touch point, when the resistive films are caused to contact each other by being touched.

In the configuration described above, the divided voltage which is measured between the X electrode pair corresponds to the resistance value of the resistive film from one of the electrodes to the touch point, that is, the distance between the electrode and the touch point. Therefore, the position of the touch point in the X direction can be detected by measuring this voltage. The same applies to the divided voltage which is measured between the Y electrode pair, and the position of the touch point in the Y direction is also detected. The two dimensional position of the touch point is detected in this manner.

Note that in touch panel input devices having the configuration described above, when two points are touched simultaneously, the voltage measured in the manner described above indicates an intermediate value between a value which is measured when one of the two points is touched and a value which is measured when the other of the two points is touched. Therefore, the substantial midpoint between the two points is detected. This point is disclosed in all of Japanese Unexamined Patent Publication No. 2000-105645; Japanese Unexamined Patent Publication No. 2007-122522; and US Published Patent Application No. 2009/0322700.

Meanwhile, US Published Patent Application No. 2009/0322700 in particular also discloses that it is possible to detect the distances between two touch points in touch panel input devices having the configuration described above, when two points are touched simultaneously. That is, when voltage is applied between one of the electrode pairs of the resistive films and two points are touched simultaneously, the resistance value between the electrodes is determined by the total resistance value of the resistive film, the two touch resistance values, and the resistance value between the two points within the other resistive film. Accordingly, the resistance value between the two points and the value of current that flows between the electrode pair will correspond to each other, and the resistance value between the two points is proportional to the distance between the two points. Therefore, the distance between the two points can be detected by measuring the current value that flows between the electrode pair.

US Published Patent Application No. 2009/0322700 also discloses that gestures, such as those in which the two touch points separate from each other, those in which the two touch points approach each other, and those in which the two tough points rotate with their approximate midpoint as the center of rotation, may be detected based on the above principle.

However, the touch panel input device disclosed in US Published Patent Application No. 2009/0322700 does not enable gestures more complex than those listed above to be detected. This point is common to conventional known resistive film type touch panel input devices.

SUMMARY

The present invention has been developed in view of the foregoing circumstances. It is an object of the present invention to provide a resistive film type touch panel input device which is capable of detecting complex gestures involving two touched points.

It is another object of the present invention to provide a method that enables detection of complex gestures input by two touched points, using such a touch panel input device.

A touch panel input device of the present invention comprises two resistive films which are arranged to face each other with a minute gap therebetween; a first electrode pair formed by electrodes provided at the edges of one of the resistive films that face each other; a second electrode pair formed by electrodes provided at the edges of the other one of the resistive films that face each other and extend in directions perpendicular to the first electrode pair; means for applying voltages between the first electrode pair and between the second electrode pair; means for measuring the voltage which is divided at two touch points with respect to the first electrode pair and the second electrode pair, when the resistive films are caused to contact each other by being touched at two points; means for measuring currents that flow between the first electrode pair and between the second electrode pairs when the touch occurs; and discriminating means, for discriminating the trajectories of the two touch points based on the values of the measured voltages and currents.

Note that the first and second electrode pairs are the same as the X electrode pair and the Y electrode pair of conventional devices described previously.

Note that it is desirable for the discriminating means to discriminate the trajectories based on the direction of change of the divided voltages and/or the currents. Further, the discriminating means may discriminate the trajectories based on the amount of change of the divided voltages and/or the currents per unit time.

In the touch panel input device of the present invention, it is desirable for the means for measuring the divided voltages and the means for measuring the currents to be configured to perform measurements during different periods of time.

A gesture detecting method of the present invention is for a touch panel input device equipped with two resistive films which are arranged to face each other with a minute gap therebetween, a first electrode pair formed by electrodes provided at the edges of one of the resistive films that face each other, and a second electrode pair formed by electrodes provided at the edges of the other one of the resistive films that face each other and extend in directions perpendicular to the first electrode pair. The method comprises applying voltages between the first electrode pair and the second electrode pair; measuring voltage which is divided at two touch points with respect to the first electrode pair and the second electrode pair and currents that flow between the first electrode pair and between the second electrode pairs, when the resistive films are caused to contact each other by being touched at two points; and discriminating the trajectories of the two touch points based on the values of the measured voltages and currents.

Note that in the gesture detecting method of the present invention, it is desirable for the trajectories to be discriminated based on the direction of change of the divided voltages and/or the currents. Further, the trajectories may be discriminated based on the amount of change of the divided voltages and/or the currents per unit time In the gesture detecting method of the present invention, it is desirable for the divided voltages and the currents to be measured during different periods of time.

As described above, the touch panel input device of the present invention is equipped with the two resistive films, the first electrode pair, the second electrode pair, the voltage applying means, the voltage measuring means, the current measuring means, and the discriminating means. When the resistive films are touched at two touch points, the discriminating means obtains the position of the approximate midpoint between the two touch points, based on the voltage measured by the voltage measuring means, that is, the voltage divided between the first electrode pair and the second electrode pair by the touch points. In addition, the discriminating means obtains the distance between the two touch points based on the currents that flow between the first electrode pair and the second electrode pair. If the position of the approximate midpoint and the distance between two touch points can be determined, it is possible to detect how the two touch points are moving as a whole, and also how the distance between the two touch points is changing. Therefore, detection of complex gestures input by two touch points, which had heretofore been impossible using conventional devices, becomes possible.

In addition, the gestures detecting method is used in a touch panel input device equipped with the two resistive films, the first electrode pairs, and the second electrode pair, as described above. Voltages are applied between the first electrode pair and the second electrode pair, and the voltages divided by touch points between the first electrode pair and the second electrode pair, and the currents that flow between the first electrode pair and the second electrode pair are measured when one of the resistive films is caused to contact the other resistive films by being touched at two touch points. The trajectories of the two touch points are discriminated based on the values of the measured voltages and currents. Therefore, detection of complex gestures input by two touch points becomes possible.

Note that in the case that the divided voltages and the currents are respectively measured during different periods of time, more accurate measurement of these values will become possible.

DETAILED DESCRIPTION OF SPECIFIC EMBODIMENTS OF THE INVENTION

Figure 1:
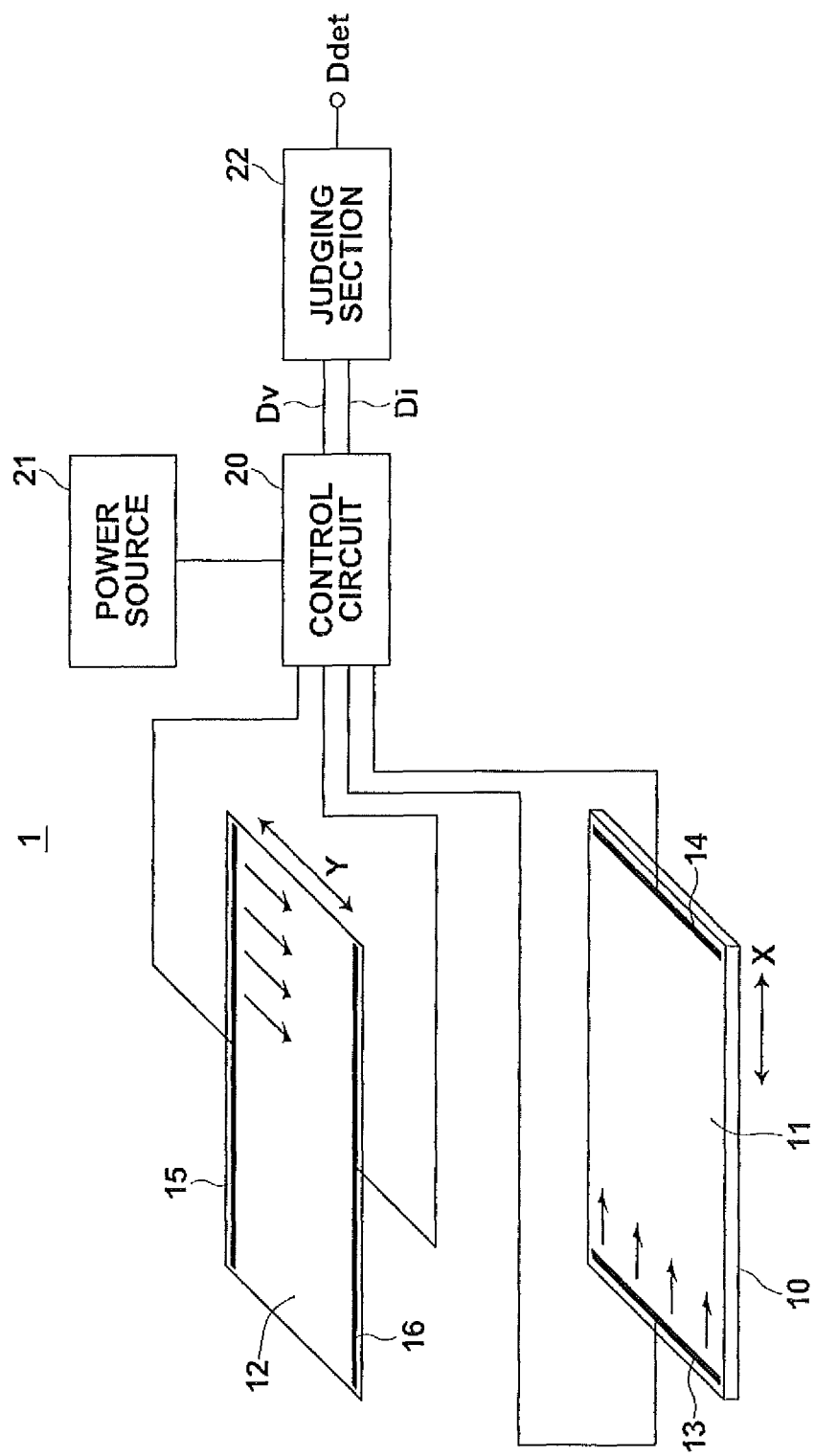
FIG. 1 shows a perspective view that illustrates the schematic structure of a touch panel input apparatus according to an embodiment of the present invention.

Hereinafter, an embodiment of the present invention will be described with reference to the attached drawings. FIG. 1 illustrates the schematic structure of a touch panel input apparatus according to an embodiment of the present invention. The touch panel input device 1 includes: a rectangular resistive film 11 provided on a base plate 10; a resistive film 12 provided as a cover sheet on the resistive film 11 with a minute space therebetween; electrodes 13 and 14 which are fixed to the left and right edges (in the drawing) of the resistive sheet 11 such that they are electrically connected to the resistive film 11; and electrodes 15 and 16 which are fixed to the upper and lower edges (in the drawing) of the resistive sheet 12 such that they are electrically connected to the resistive film 12. The electrodes 13 through 16 are connected to a control circuit 20. A DC power source 21 and a discriminating section 22 are connected to the control circuit 20.

The resistive films 11 and 12 are constituted by thin film like substrates formed by polyethylene terephthalate (PET), and layers of conductive films having uniform electrical resistivity formed thereof. The resistive films 11 and 12 are provided such that the surfaces on which the conductive films are formed face each other. By interposing insulative spacers (not shown), a minute gap is formed between the resistive films 11 and 12 in a normal state. Note that the resistive film 11 may be formed as a film coated directly on the base plate, without using the aforementioned substrate.

In the case that the base plate 10 has display elements, such as liquid crystal display elements, formed on the upper surface thereof, the contents displayed by the display elements and input by the touch panel input device 1 can be linked. In this case, it is desirable for the resistive films 11 and 12 to be formed by transparent materials. Examples of materials for such transparent resistive films 11 and 12 include: indium tin oxide (ITO); conductive polymers; and carbon nanotube containing organic films.

The electrodes 13 and 14 face each other in the X direction in FIG. 1, that is, a direction parallel to the upper and lower edges of the resistive films 11 and 12 in the drawing. The pair of electrodes 13 and 14 will be referred to as an X electrode pair (first electrode pair). The electrodes 15 and 16 face each other in the Y direction in FIG. 1, that is, a direction parallel to the left and right edges of the resistive films 11 and 12 in the drawing. The pair of electrodes 15 and 16 will be referred to as a Y electrode pair (second electrode pair).

Figure 2:
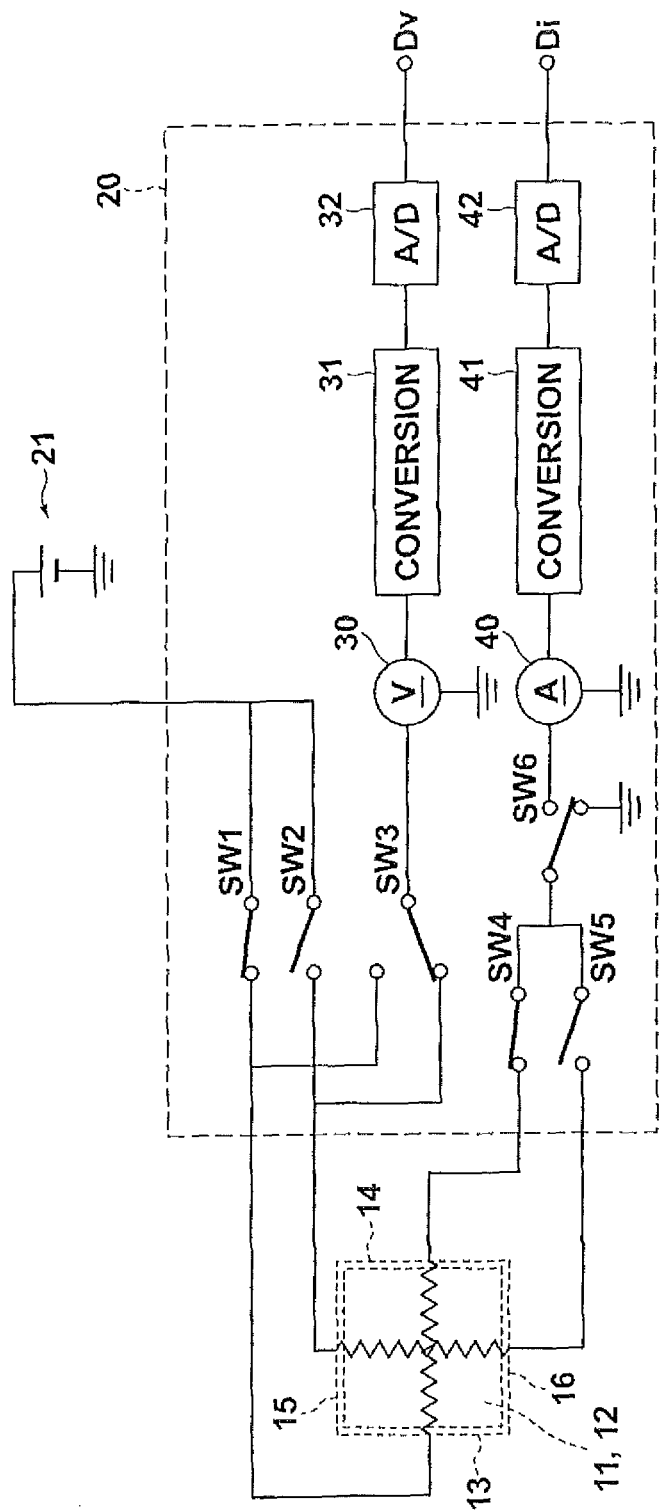
FIG. 2 shows a circuit diagram that illustrates the electrical structure of the touch panel input device.

Next, the control circuit 20 will be described in detail with reference to FIG. 2. As illustrated in FIG. 2, the control circuit 20 includes: a voltmeter 30 for measuring divided DC voltage to be described later; a converting circuit 31 for converting the output of the voltmeter 30 to voltage signals within a predetermined range; and an A/D converter 32, for converting analog signals output by the converting circuit 31 into digital signals. In addition, the control circuit 20 includes: an ammeter 40 for measuring DC current to be described later; a converting circuit 41 for converting the output of the ammeter 40 to voltage signals within a predetermined range; and an A/D converter 42, for converting analog signals output by the converting circuit 41 into digital signals.

Further, the control circuit 20 includes: a switch SW1 provided along a path that connects the electrode 13 fixed to the resistive film 11 to the DC power source 21; a switch SW2 provided along a path that connects the electrode 15 fixed to the resistive film 12 to the DC power source 21; a switch SW3 that selectively connects either of the two paths or neither of the two paths (intermediate position) to the voltmeter 30; a switch SW4 provided along a path that connects the electrode 14 fixed to the resistive film 11 to the ammeter 40; a switch SW5 provided along a path that connects the electrode 15 fixed to the resistive film 12 to the ammeter 40; and a switch SW6 that selectively connects the switches SW4 and SW5 to the ammeter 40 or to ground.

The control circuit 20 configured as described above may be constituted by discrete circuits, or by integrated circuits. The discriminating section 22 illustrated in FIG. 1 is generally constituted by a microcomputer or the like.

Figure 3:
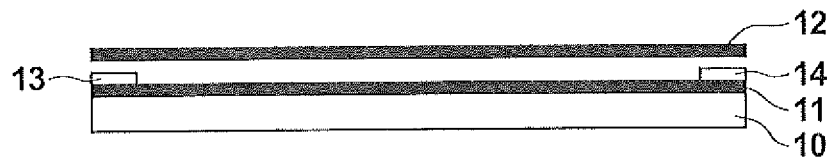
FIG. 3 shows a schematic side view that illustrates the state of two resistive films of the touch panel input device.
Figure 4:
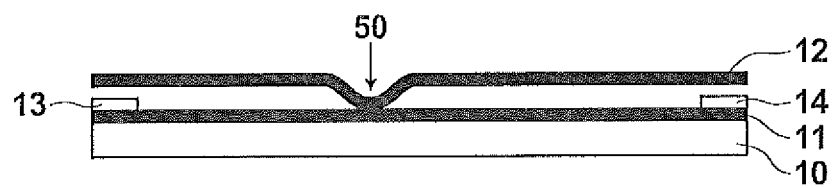
FIG. 4 shows a schematic side view that illustrates a state in which the resistive films are touched at a single point.
Figure 5:
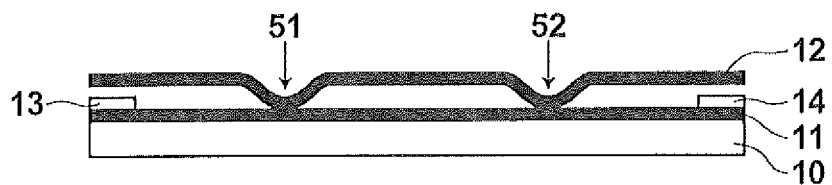
FIG. 5 shows a schematic side view that illustrates a state in which the resistive films are touched at two points.

Next, the operation of the touch panel input device 1 will be described. A state in which the resistive film 12 toward the surface of the touch panel input device 1 is not being touched is illustrated in the schematic section view of FIG. 3. FIG. 4 schematically illustrates a state in which the resistive film 12 is being touched at a single touch point 50, and FIG. 5 schematically illustrates a state in which the resistive film 12 is being touched at two touch points 51 and 52.

The touch points are detected as will be described below. During detection of touch input, the control circuit 20 of FIG. 2 sets the switches included therein as follows during periods (a) through (d) below.

(a) Switch SW1: Closed; Switch SW2: Open; Switch SW3: Connected with electrode 15; Switch SW4: Closed; Switch SW5: Open; Switch SW6: Connected to ground; (b) Switches SW1, SW2, SW4, and SW5: The same state as during period (a), Switch SW3: Intermediate position (connected to neither the electrode 13 nor the electrode 15); Switch SW6: Connected to ammeter 40; (c) Switch SW1: Open; Switch SW2: Closed; Switch SW3: Connected with electrode 13; Switch SW4: Open; Switch SW5: Closed; Switch SW6: Connected to ground (d) Switches SW1, SW2, SW4, and SW5: The same state as during period (c), Switch SW3: Intermediate position; Switch SW6: Connected to ammeter 40. The lengths of periods (a) through (d) are predetermined and extremely short, and the periods (a) through (d) are cyclically repeated as (a), (b), (c), (d), (a), (b), . . . Note that FIG. 2 illustrates a state during period (a) above.

During periods (a) and (b), the positions of the touch points and the interval between the touch points in the X direction are obtained, and during periods (c) and (d), the positions of the touch points and the interval between the touch points in the Y direction are obtained.

Figure 6:
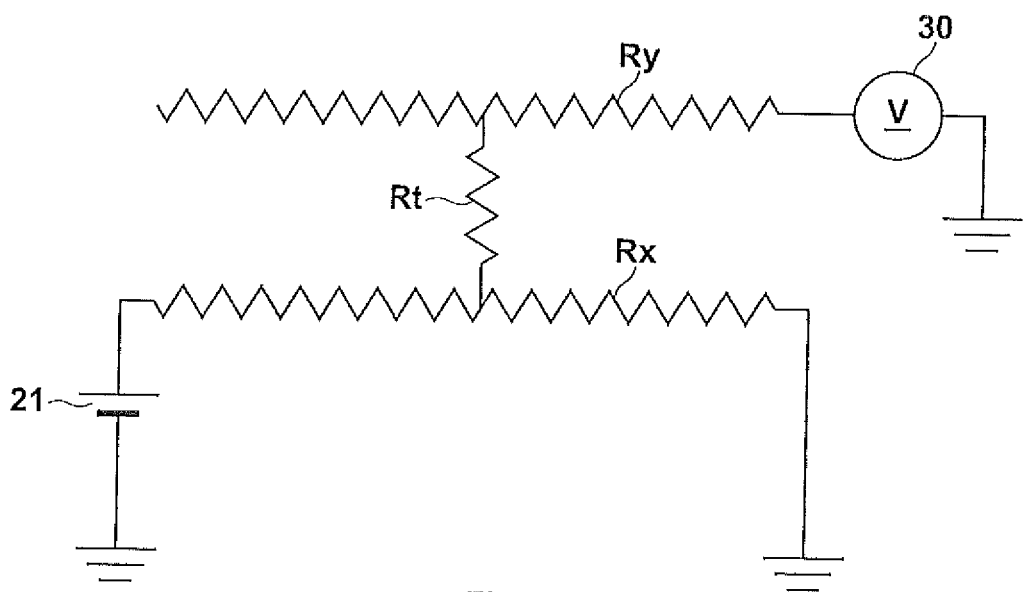
FIG. 6 shows an equivalence circuit diagram of the resistive films when no touch is being applied to the touch panel input device.

That is, in the case that the touch input is at a single touch point as illustrated in FIG. 4 during period (a), the equivalence circuit of the resistive films 11 and 12, etc. is that illustrated in FIG. 6. Note that in FIG. 6, Rx denotes the resistance of the resistive film 11, Ry denotes the resistance of the resistive film 12, and Rt denotes contact resistance (the same applies to the following Figures). The DC voltage which is being applied between the electrodes 13 and 14 of the resistive film 11 by the DC power source 21 is divided by the touch point 50. The divided voltage is measured by the voltmeter via the contact resistance Rt and the resistance Ry of the resistive film 12. The divided voltage corresponds to the resistance of the resistive film 11 from the electrode 13 to the touch point, that is, the distance therebetween. Therefore, the distance from the electrode 13 to the touch point, that is, the position of the touch point in the X direction, can be obtained based on the voltage measured by the voltmeter 30.

Figure 7:
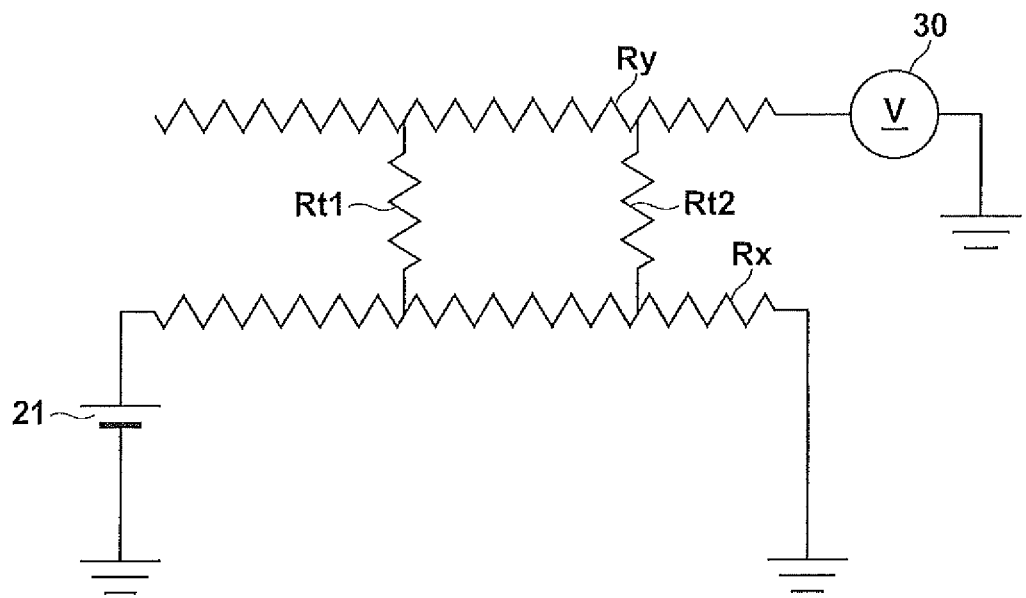
FIG. 7 shows an equivalence circuit diagram of the resistive films when the touch panel input device is being touched at a single point.

Meanwhile, in the case that the touch input is at two touch points as illustrated in FIG. 5 during period (a), the equivalence circuit of the resistive films 11 and 12, etc. is that illustrated in FIG. 7. Note that in FIG. 7, Rt1 and Rt2 denote contact resistance. The voltage which is divided by the two touch points at this time takes a value at approximately the midpoint between the voltage which is divided by only one of the touch points and the voltage which is divided only by the other touch point. Therefore, in this case, the distance from the electrode 13 to the approximate midpoint between the two touch points, that is, the position of the midpoint in the X direction, can be obtained based on the voltage measured by the voltmeter 30.

Figure 8:
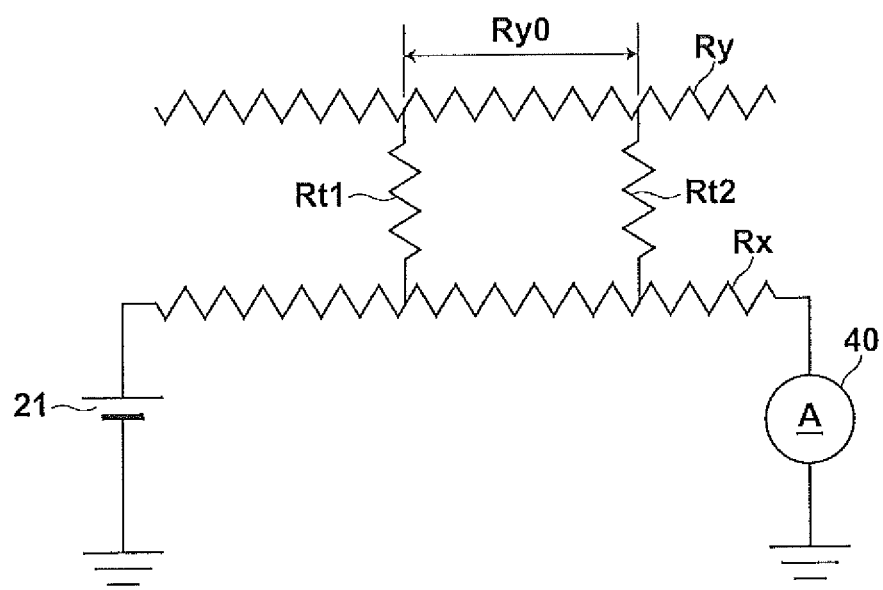
FIG. 8 shows an equivalence circuit diagram of the resistive films when the touch panel input device is being touched at two points.

Next, in the case that the touch input is at two touch points as illustrated in FIG. 5 during period (b), the equivalence circuit of the resistive films 11 and 12, etc. is that illustrated in FIG. 8. Accordingly, the DC current that flows between the electrode 13 and the electrode 14 is measured by the ammeter 40. At this time, the resistance between the electrode 13 and the electrode 14 is a combined resistance of the resistance Rx of the resistive film 11 itself, the contact resistance Rt1 and Rt2 which are connected in parallel with respect to portion of the resistive film 11, and a resistance Ry0 of the resistive film 12 between the two touch points. The resistance Ry0 between the touch points is proportionate to the distance between the two touch points in the X direction. Therefore, the distance between the two touch points in the X direction can be obtained, based on the current measured by the ammeter 40.

Note that as disclosed in aforementioned Patent Document 3, the combined resistance when touch input is performed at two points takes a value which is clearly lower than the resistance when touch input is performed at a single point, or when touch input is not being performed. Therefore, it is possible to subject the signal output from the ammeter 40 to a threshold value process, to discriminate whether there is no touch input or a touch input is being performed by a single touch point, or touch input is being performed by two touch points.

Detection of the position of a single touch point, the position of an approximate midpoint between two touch points, and the distance between two touch points in the X direction during periods (a) and (b) has been described above. During periods (c) and (d), the position of a single touch point, the position of an approximate midpoint between two touch points, and the distance between two touch points in the X direction are detected with respect to the Y direction. The methods of detection are the same as those with respect to the X direction, and therefore, a detailed description will be omitted.

The signals output by the voltmeter 30 are converted to voltage signals within a predetermined range by the converting circuit 31 of FIG. 2. Then, the voltage signals are A/D converted by the A/D converter 32, and are output as digital signals Dv that indicate the position of a single touch point or the approximate midpoint of two touch points in the X and Y directions. The signals output by the ammeter 40 are converted to voltage signals within a predetermined range by the converting circuit 41 of FIG. 2. Then, the voltage signals are A/D converted by the A/D converter 42, and are output as digital signals Di that indicate distance between two touch points in the X and Y directions.

The digital signals Dc that indicate the position of the approximate midpoint between two touch points and the digital signals Di that indicate the distance between the two touch points are input to the discriminating section 22. The discriminating section 22 discriminates the trajectories of the two touch points 51 and 52, based on changes in the signals Dv and Di over time.

The digital signals Dv include periodically repeating components that indicate the position of the approximate midpoint between two touch points in the X direction and the Y direction. Therefore, the discriminating section 22 can detect from what position and in what direction the aforementioned midpoint, that is, the two touch points, is moving, based on the values and the direction of change of each component. If the speed that the two touch points move at is high, the amount of change of the components per unit time will become greater. Therefore, the movement speed of the touch points can also be detected based on the amounts of change per unit time.

The digital signals Di include periodically repeating components that indicate the distance between two touch points in the X direction and the distance between two touch points in the Y direction. Therefore, the discriminating section 22 can detect from what values the distance between two touch points in the X direction and the distance between two touch points in the Y are increasing or decreasing, as well as the amounts of the increase or decrease. At this time, if the speed that the distance between two touch points changes is high, the amount of change of the components per unit time will become greater. Therefore, the speed at which the distance between the touch points is changing can also be detected, based on the amounts of change per unit time.

Figure 9:
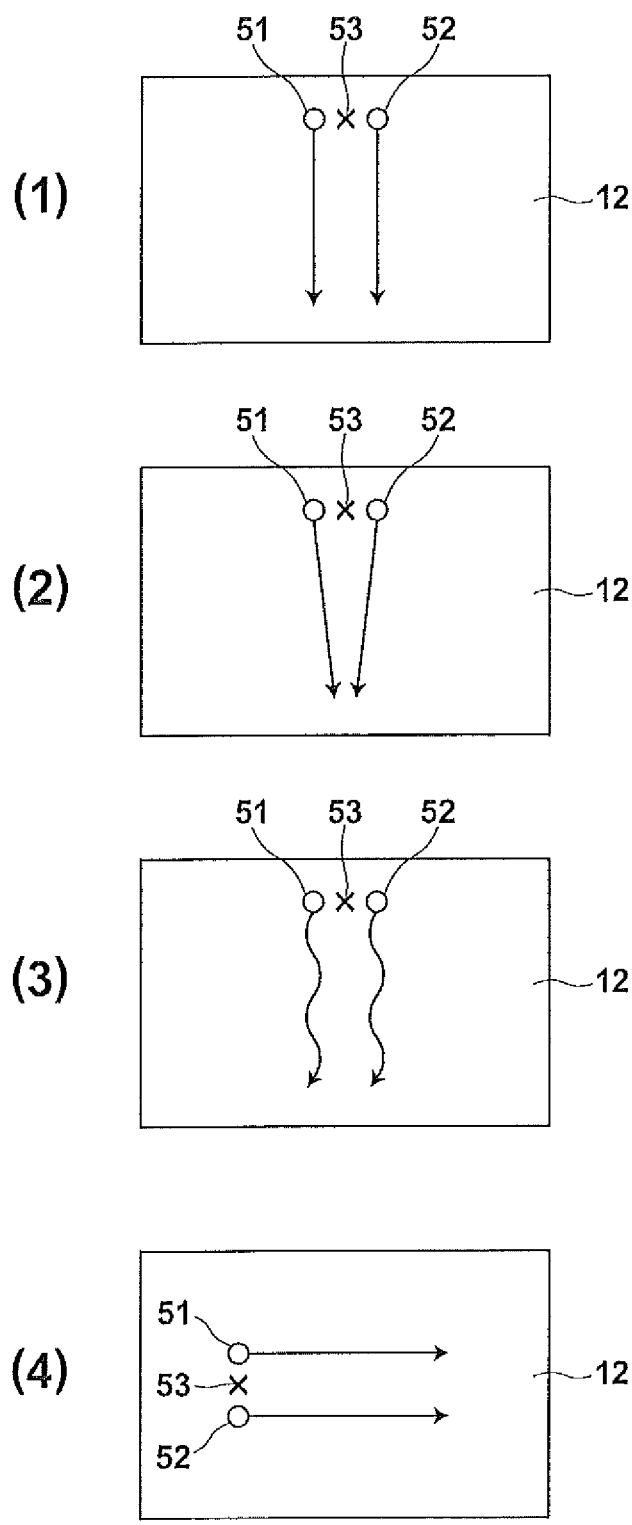
FIG. 9 shows schematic diagrams that illustrate examples of trajectories of touch points on the touch panel input device.

As described above, the discriminating section 22 is capable of discriminating the trajectories of the two touch points 51 and 52 indicated by arrows in (1), (2), (3), and (4) of FIG. 9, that is, gestures which are performed on the resistive film 12 by two fingers. The discriminating section 22 outputs discrimination signals Dout that indicate gestures which are detected in this manner.

Note that reference numeral 53 in FIG. 9 denotes a point indicated by the digital signals Dv to be the approximate midpoint between the two touch points 51 and 52. In addition, the trajectories of the touch points 51 and 52 capable of being discriminated by the discriminating section 22 are not limited to those illustrated in FIG. 9.

The gestures illustrated in FIG. 9 may be utilized as triggers for performing various types of processes. As an example, in the case that the base plate 10 is equipped with display elements for displaying electronic books on the surface thereof, the gesture illustrated in (1) of FIG. 9 may be a trigger to scroll a display range downward, the gesture illustrated in (2) of FIG. 9 may be a trigger to temporarily close a page, the gesture illustrated in (3) of FIG. 9 may be a trigger to lock page scrolling, and the gesture illustrated in (4) of FIG. 9 may be a trigger to initiate page scrolling.

Alternatively, in the case that the base plate 10 is equipped with display elements that constitute a display screen for an electronic game, the trajectories of the two touch points may be displayed by the display elements, to create scenes in which text or figures are drawn in sand with two fingers, for example.

Note that in the embodiment described above, the voltage detection by the voltmeter 30 and the current detection by the ammeter 40 were performed separately at different points in time. However, the voltage detection and the current detection may be performed simultaneously.

What is claimed:

1. A touch panel input device, comprising:
   two resistive films which are arranged to face each other with a minute gap therebetween;
   a first electrode pair formed by electrodes provided at the edges of one of the resistive films that face each other;
   a second electrode pair formed by electrodes provided at the edges of the other one of the resistive films that face each other and extend in directions perpendicular to the first electrode pair; and
   circuitry configured to:
   apply voltages between the first electrode pair and between the second electrode pair;
   measure divided voltages which are divided at two touch points with respect to the first electrode pair and the second electrode pair when the resistive films are caused to contact each other by being touched at the two touch points;
   measure currents that flow between the first electrode pair and between the second electrode pair when the touch occurs, wherein the currents indicate distance between the two touch points; and
   discriminate trajectories of the two touch points based on the values of the measured divided voltages and currents.

2. A touch panel input device as defined in claim 1, wherein the circuitry is configured to discriminate the trajectories based on the direction of change of the divided voltages and the currents.

3. A touch panel input device as defined in claim 1, wherein the circuitry is configured to discriminate the trajectories based on the amount of change of the divided voltages and the currents per unit time.

4. A touch panel input device as defined in claim 2, wherein the circuitry is configured to discriminate the trajectories based on the amount of change of the divided voltages and the currents per unit time.

5. A touch panel input device as defined in claim 1, wherein the circuitry is configured to measure the divided voltages and the currents during different periods of time.

6. A touch panel input device as defined in claim 2, wherein the circuitry is configured to measure the divided voltages and the currents during different periods of time.

7. A touch panel input device as defined in claim 3, wherein the circuitry is configured o measure the divided voltages and the currents during different periods of time.

8. A touch panel input device as defined in claim 4, wherein the circuitry is configured to measure the divided voltages and the currents during different periods of time.

9. A gesture detecting method for a touch panel input device equipped with two resistive films which are arranged to face each other with a minute gap therebetween, a first electrode pair formed by electrodes provided at the edges of one of the resistive films that face each other, and a second electrode pair formed by electrodes provided at the edges of the other one of the resistive films that face each other and extend in directions perpendicular to the first electrode pair, comprising:

applying voltages between the first electrode pair and the second electrode pair;

measuring divided voltages which are divided at two touch points with respect to the first electrode pair and the second electrode pair and currents that flow between the first electrode pair and between the second electrode pairs when the resistive films are caused to contact each other by being touched at the two touch points, wherein the currents indicate distance between the two touch points; and discriminating the trajectories of the two touch points based on the values of the measured divided voltages and currents.

10. A gesture detecting method as defined in claim 9, wherein the trajectories are discriminated based on the direction of change of the divided voltages and the currents.

11. A gesture detecting method as defined in claim 10, wherein the trajectories are discriminated based on the amount of change of the divided voltages and the currents per unit time.

12. A gesture detecting method as defined in claim 9, wherein the divided voltages and the currents are measured during different periods of time.

13. A gesture detecting method as defined in claim 10, wherein the divided voltages and the currents are measured during different periods of time.

14. A gesture detecting method as defined in claim 11, wherein the divided voltages and the currents are measured during different periods of time.

15. A gesture detecting method as defined in claim 12, wherein the divided voltages and the currents are measured during different periods of time.

16. A touch panel input device as defined in claim 1, wherein the divided voltages indicate a midpoint of the two touch points.

17. A touch panel input device as defined in claim 16, wherein:
 the divided voltages indicate the midpoint of the two touch points in an X direction and a Y direction; and
 the currents indicate the distance between the two touch points in the X direction and the Y direction.

18. A gesture detecting method as defined in claim 9, wherein the divided voltages indicate a midpoint of the two touch points.

19. The gesture detecting method as defined in claim 18, wherein:
 the divided voltages indicate the midpoint of the two touch points in an X direction and a Y direction; and
 the currents indicate the distance between the two touch points in the X direction and the Y direction.

* * * * *